United States Patent [19]

Van Meegen

[11] Patent Number: 4,765,194

[45] Date of Patent: Aug. 23, 1988

[54] PISTON-OPERATED MACHINE

[75] Inventor: Hendrikus A. B. Van Meegen, Gladstone, Australia

[73] Assignee: Van Meegan Constructions Pty. Ltd., Australia

[21] Appl. No.: 840,560

[22] PCT Filed: Jun. 27, 1985

[86] PCT No.: PCT/AU85/00143

§ 371 Date: Feb. 26, 1986

§ 102(e) Date: Feb. 26, 1986

[87] PCT Pub. No.: WO86/00367

PCT Pub. Date: Jan. 16, 1986

[30] Foreign Application Priority Data

Jun. 27, 1984 [AU] Australia .... PG5709

[51] Int. Cl.[4] .... F16H 23/00

[52] U.S. Cl. .... 74/60; 92/71; 91/502; 417/269

[58] Field of Search .... 74/60; 123/58 BB, 58 C; 91/502; 92/12.2, 71, 70; 417/269

[56] References Cited

U.S. PATENT DOCUMENTS

| | | | |
|---|---|---|---|
| 2,303,838 | 12/1943 | Hall | 74/60 |
| 2,335,415 | 11/1943 | Holmes | 74/60 |
| 2,387,908 | 10/1945 | Howard | 74/60 |

FOREIGN PATENT DOCUMENTS

| | | | |
|---|---|---|---|
| 2783 | 2/1912 | United Kingdom | 74/60 |
| 662190 | 12/1951 | United Kingdom | 74/60 |
| 0260615 | 10/1928 | Italy | 74/60 |

*Primary Examiner*—Kenneth J. Dorner

*Assistant Examiner*—Gerald A. Anderson

*Attorney, Agent, or Firm*—Larson and Taylor

[57] ABSTRACT

A piston-operated machine is disclosed having a crank shaft and an intermediate crank section, the axis of the crank section being oblique to the axis of the crank shaft. The crank section passes rotatably and centrally through a wobble plate, and the center of the wobble plate lying on a prolongation of the axis of the crank shaft. A plurality of cylinders are provided having axes parallel to and equally spaced from the axis of the crank shaft. A piston in each cylinder is mounted on a piston rod extending coaxially from the cylinder to a respective connection on the wobble plate spaced from the center of the wobble plate. Each piston rod is rotatably but non-slidably engaged in a thrust member eccentrically rotatable in a thrust plate mounted to rotate about the same axis as the wobble plate.

11 Claims, 2 Drawing Sheets

Fig. 1.
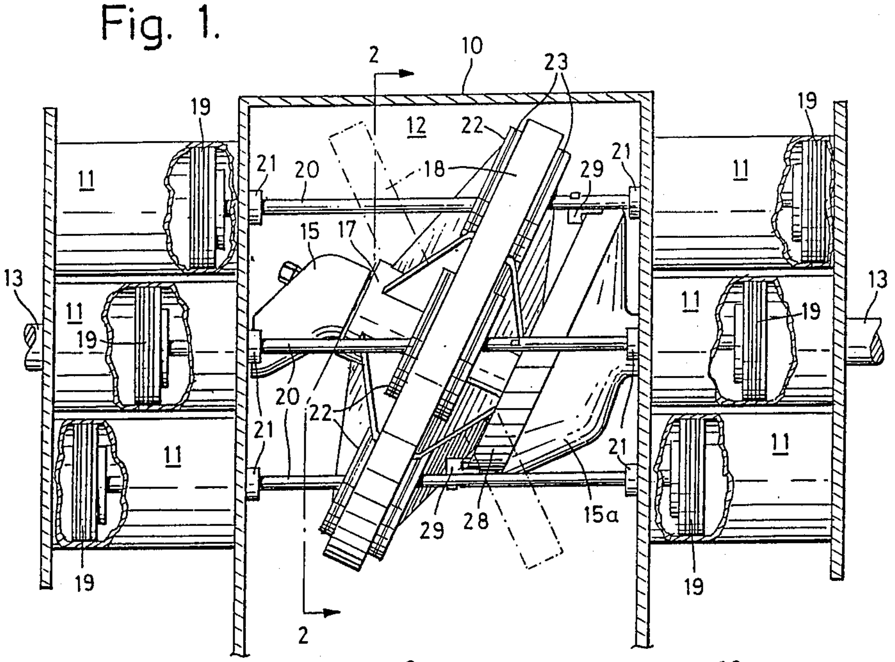
Fig. 2.
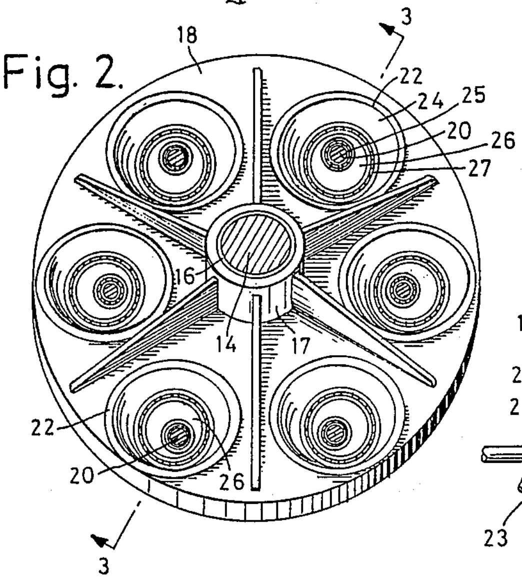
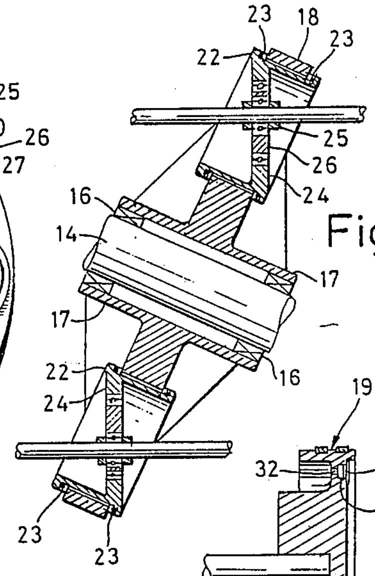
Fig. 3.
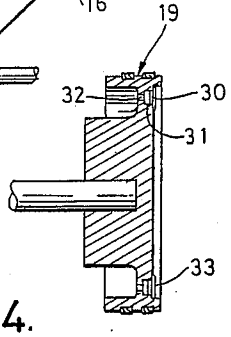
Fig. 4.

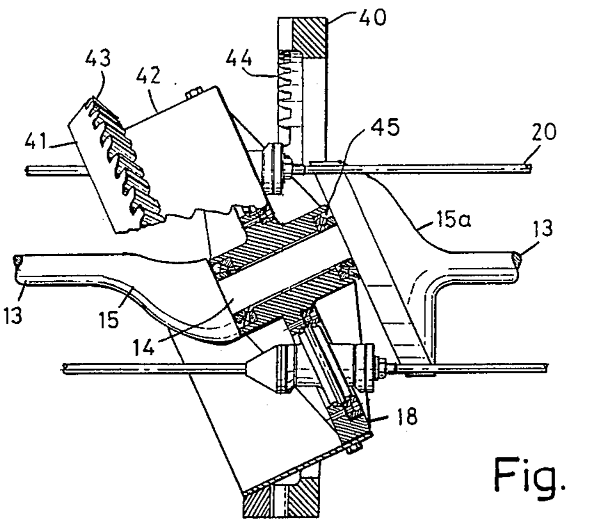
Fig. 5
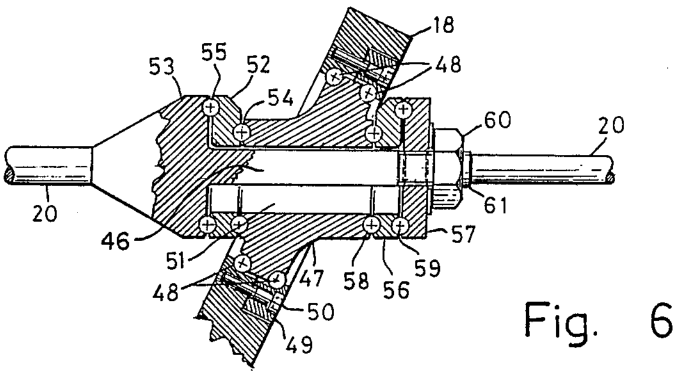
Fig. 6
Fig. 7
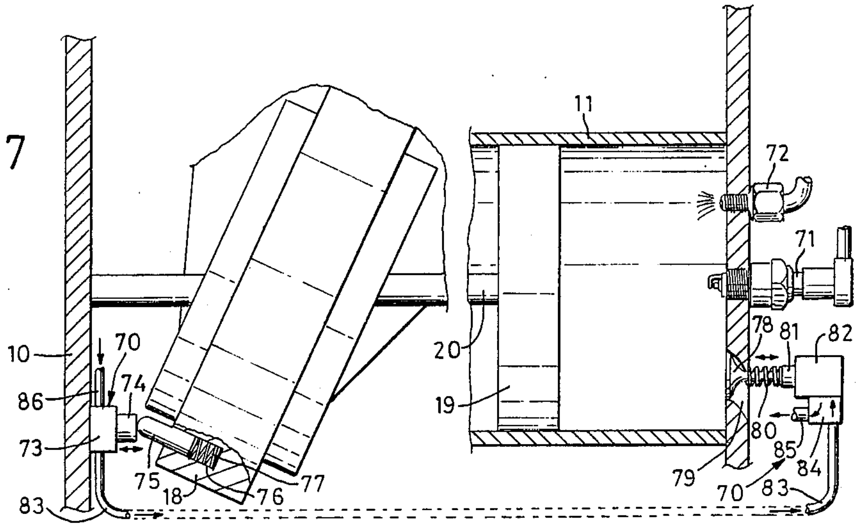

PISTON-OPERATED MACHINE

BACKGROUND OF THE INVENTION (1) Field of the Invention

This invention relates to a piston-operated machine.

SUMMARY OF THE PRESENT INVENTION

The general object of the invention is to provide a piston-operated machine which may, with appropriate modifications, be used as an internal combustion or external combustion motor, or as a pump or compressor, and which is particularly efficient and smooth-running in operation.

Broadly, the invention resides in a piston-operated machine including a crank shaft having an intermediate crank section the axis of the crank section being oblique to the axis of the crank shaft and the crank section passing rotatably and centrally through a wobble plate, the centre of the wobble plate lying on a prolongation of the axis of the crank shaft; a plurality of cylinders, their axes parallel to and equally spaced from the axis of the crank shaft; a piston in each cylinder mounted on a piston rod extending coaxially from the cylinder to a respective connection on the wobble plate spaced from its centre; each piston rod, at its said connection, being rotatably but non-slidably engaged in a member eccentrically rotatable, about an axis parallel to the axis of the crank shaft, in a thrust plate mounted for rotation, about the same axis, in a wobble plate.

Preferably each cylinder is paired with another to the opposite side of the wobble plate, the pistons of the two paired cylinders being fixed to opposite ends of a common piston rod; and means are provided for restraining the piston rods from rotational movement.

Other preferred features of the invention will become apparent from the following description.

BRIEF DESCRIPTION OF THE DRAWINGS

In order that the invention may be readily understood, reference is now made to the accompanying drawings showing, more or less diagrammatically, preferred embodiments of the invention, wherein:

FIG. 1 is a partly broken-away side elevation of the machine;

FIG. 2 is a sectional view taken along line 2—2 in FIG. 1;

FIG. 3 is a sectional view taken along line 3—3 in FIG. 2;

FIG. 4 is a sectional view, to larger scale, of a piston of the machine;

FIG. 5 is a part sectional side view of an alternative embodiment of the wobble plate where a gear walks around a fixed ring to prevent rotation of the wobble plate;

FIG. 6 is a sectional side view of an alternative embodiment of connecting the piston rods to the wobble plate;

FIG. 7 is a schematic view of the valve gear, ignition system and fuel injection for an embodiment of the invention operating as a four-stroke internal combustion engine.

DETAILED DESCRIPTION OF THE PREFERRED EMBODIMENTS

The machine illustrated in FIGS. 1 to 4 includes an engine block 10 with a cluster of cylinders 11 at both sides of a central crank chamber 12. In the embodiment illustrated, each cluster comprises six cylinders 11 is equidistantly spaced arrangement, their axes parallel to and equidistant from a crank shaft 13 rotatable in any suitable bearings (not shown), corresponding cylinders of the two clusters being coaxially aligned as pairs.

Within the crank chamber 12 is intermediate crank section 14 an which may be formed integrally with the crank shaft 13, or alternatively its cheeks 15 and 15*a* may be fixedly mounted on the inner ends of the two coaxially aligned end portions of the shaft. The axis of the crank section 14 is at an angle to, and centrally intersected by, a prolongation of the axis of the crank shaft.

The crank section 14 is rotatable in bearings 16 in opposed hub bosses 17 of a coaxial wobble plate 18 which is circular but because of its angular disposition appears elliptical in end view, as shown in FIG. 2.

In each of the cylinders is a piston 19, the two pistons of each pair of opposed cylinders 11 of the two clusters being fixed coaxially on the ends of a common piston rod 20 slidable through bearings 21 at the inner ends of the cylinders 11. Each of the piston rods 20 has its central part fixed rotatably but non-slidably within a thrust block 22 mounted in the wobble plate 18. The thrust blocks are similar cylinders, their axes parallel to and equidistant from the axis of the wobble plate 18 and each is rotatable in anti-friction bearings 23 at opposite sides of the wobble plate. Formed integrally within each cylindrical thrust block is a skewed plate 24 which is angled in the block so that its axis is parallel to that of the crank shaft 13 and the axes of the piston rods 20. The middle part of each piston rod 20 is rotatable, but restrained from longitudinal movement in a thrust bearing 25, mounted eccentrically in a disc-shaped compensator thrust member 26 which itself is rotatable, coaxially with the skewed plate 24, in anti-friction bearings 27 in the skewed plate.

One cheek 15*a* of the crank carries a control ring 28 which is an oblique section of a cylinder coaxial with the crank shaft, its angularity corresponding to that of the wobble plate 18. The control ring slidably engages a retainer 29 on each of the piston rods 20 so as to prevent rotational movement of the rod, and acts as a guide for the piston rods (particularly in a single end version of the machine) to ensure correct alignment of the piston rods with the cylinders and the bearings 25, thereby counteracting any torque effects on the wobble plate 18 as the machine is accelerated or decelerated.

With rotation of the crank shaft 13 the wobble plate 18 moves in a wobbling manner between positions indicated in full and broken outline in FIG. 1. The wobble plate has, however, only very limited rotational or oscillatory motion, so that any point on its periphery follows an elongated figure-eight path.

Referring to FIG. 5, it may be preferred to counteract any contra-torque forces on the wobble plate by means of a toothed annulus or ring 40 on the housing 10 coaxial with the crank shaft 13, the peripheral part of the wobble plate 18 being fitted with a gear 41 or a hub 42, the gear 41 being formed with a series of teeth 43 each of which, as the crank shaft is rotated, engages in sequence between two teeth 44 of the annulus or ring 40, moving to disengagement as the next tooth 43 engages, the teeth 43, 44 of the two series being shaped to permit, and control, the figure-eight motion of the wobble plate 18.

In the embodiment of FIG. 5, the wobble plate 18 is mounted on the crank section 14 via tapered roller thrust bearings 45 and the piston rods 20 for one cluster of the cylinders 11 passes through slots or holes formed in cheek 15*a* of the crank shaft 13. The connection of the piston rods 20 to the wobble plate 18 in this embodiment will now be described with reference to FIG. 6.

Each piston rod 20 has its central part 46 fixed rotatably but non-slidably within a thrust block 47 mounted in a wobble plate 18. In this embodiment, element 47 constitutes both the thrust member and the thrust block. The thrust blocks 47 have their axis parallel to and equidistant from the axis of the wobble plate 18, as hereinbefore described and each is rotatable in antifriction bearings 48 in opposite sides of the wobble plate 18, the bearings being retained by a keeper ring 49 secured by Allen screws 50. Each thrust block 47 has a central bore 51 through which the central part 46 of the piston rod 20 passes. A first thrust ring 52 is interposed between each thrust block 47 and a circumferential thrust flange 53 on the piston rod 20 by bearings 54, 55; while a second thrust ring 56 is interposed between the thrust block 47 and a compensator plate 57 via bearings 58, 59. (A nut 60 screwed onto a threaded portion 61 of the piston rod 20 clamps the assembly together with the prescribed preload on the bearings 54, 55, 58 and 59).

As shown in the drawing, the piston rod 20 is rotatable coaxially with the compensator plate 57 which is rotatable eccentrically with the thrust block 47, the piston rod 20 being restrained against longitudinal movement relative to the thrust block 47. (The enlarged bore 51 in the thrust block 47 enables the piston rod 20 to move eccentrically within the thrust block).

As the invention may be applied to a two-stroke or a four-stroke internal combustion engine, or to a diesel engine, or to an external combustion engine, or to a compressor or pump, the valve gear 70, ignition system (e.g. spark plug 71) and full injection or carburation system (e.g. fuel injection nozzle 72) and other ancillaries are only shown schematically in FIG. 7, but may be of generally conventional type appropriate to the particular application of the invention.

The valve gear 70 has a pair of master cylinders 73 for each cylinder 11 (only one of which is shown) mounted on the engine block 10. The piston 74 of each master cylinder is operably engaged by a striker 75 mounted in a bore 76 in the adjacent side of the face of the wobble plate 18. A coil spring 77 in the bore becomes elongated, due to centrifugal force, as the rotational speed of the machine increases to increase the time during which the striker 75 engages the piston 74.

This automatically advances the opening of the intake (or exhaust) valve 78 relative to top dead centre (TDC) of the piston 19 and also increases the time for which the valve 78 is kept open. (For clarity, only the intake valve 78 and intake port 79, sans manifold, are shown).

The intake valve 78 is normally held closed by a compression valve spring 80, while the valve is opened by the piston 81 of a slave cylinder 82.

The slave cylinder 82 is connected to the master cylinder 73 via an oil line 83 and a hydraulic valve unit 84 which has an exhaust line 85.

The valve unit 84 is arranged so that when the master cylinder 73 is operated by the striker 75, pressurized oil is directed to the slave cylinder 82 to open the intake valve 78. However, when the striker 75 is disengaged from the master cylinder, the pressure in the oil line 83 is reduced and the intake valve 78 is closed by the valve spring 80. A hinged valve member (not shown) in the valve unit 84 directs the oil exhausted from the slave cylinder 82 through the exhaust line 85 back to the engine sump (not shown).

Oil is supplied to the master cylinder 73 from the oil pump (not shown) via an inlet line 86 and one way check valve (not shown).

In a modification of the invention (not shown) the elliptical wobble plate is replaced by one in the form of a beam-like cross-member through which the crank 14 passes centrally, a single compensator 22 being provided at each end portion of the plate for engagement by the piston rods of two pairs of opposed cylinders. Again, the wobble plate may be Y-shaped, or cruciform, for three or four pairs of opposed cylinders.

In another modification, instead of pairs of opposed cylinders, a single cluster of cylinders only is provided, the wobble plate being acted on at one side only.

In yet another embodiment of the invention, two wobble plates are provided, on two cranks of the one crank shaft, the cranks, and therefore the wobble plates also, being of opposite obliquity to the crank shaft axis, each of the wobble plates being operatively connected, through piston rods, to the pistons of a single cluster of cylinders.

For smooth operation of the machine, balance weights (if required) may be fitted to, or be formed integrally with, the cheeks 15 and 15*a* of the crank shaft 13.

FIG. 4 illustrates in section a piston 19 which incorporated an annular valve 30 seated in an annular recess 31 formed in one face of the piston and communicating through a number of apertures 32 through the piston. When the valve is seated, the apertures 32 are closed; but the valve may be unseated when pressure applied below the piston is greater than the pressure above the piston e.g. when the exhaust valve first opens causing a rapid pressure drop in the combustion chamber of the cylinder, so that gas may pass through the piston. The valve is prevented from leaving the piston by keepers 33. In such an arrangement, the intake valves may suitably be reed valves at the inside ends of the cylinders.

Engines, pumps and the like made in accordance with the invention will be found to be very efficient in operation and in this and other respects to represent a considerable improvement over other machines hitherto proposed and, as an engine, utilizing a piston-driven wobble plate or its equivalent, or, as a pump, diriving pistons by means of a wobble plate or the like.

It will be understood, of course, that the embodiments of the invention herein described and illustrated may be subject to many modifications of constructional detail and design other than those hereinbefore mentioned, and which will be readily apparent to persons skilled in the art, without departing from the scope of the invention as defined in the appended claims.

What is claimed is:

1. A piston-operated machine including:

a crank shaft having an intermediate crank section, the axis of the crank section being oblique to the axis of the crank shaft and the crank section passing rotatably and centrally through a wobble plate, the centre of the wobble plate lying on a prolongation of the axis of the crank shaft;

a plurality of cylinders, the axes of said cylinders being parallel to and equally spaced from the axis of the crank shaft;

a piston in each cylinder mounted on a piston rod extending substantially coaxially from the cylinder to a respective connection on the wobble plate spaced from the centre of the wobble plate;

each piston rod, at the said connection of that piston rod to the wobble plate, being rotatably and eccentrically but non-slidably engaged in a thrust member which is rotatable about an axis parallel to the axis of the crank shaft, the thrust member being connected to a thrust block which is mounted in the wobble plate for rotation about an axis parallel to the wobble plate axis.

2. A machine as claimed in claim 1 wherein:

each cylinder is paired with another cylinder on the side of the wobble plate opposite from the first said piston and cylinder, taken in a direction parallel to the crank shaft axis, the pistons of the two paired cylinders being fixed to opposite ends of a common piston rod; and means are provided for restraining the piston rods from rotational movement about their respective axes.

3. A machine as claimed in claim 1 wherein:

each said thrust member forming the connection of each piston rod to the wobble plate being a compensator plate, a bearing means mounted in the compensator plate eccentrically relative to the center of that compensator plate, the compensator plate being rotatably mounted in a skewed plate, the skewed plate being part of the thrust block.

4. A machine as claimed in claim 1 wherein:

the wobble plate is restrained for only very limited rotational or oscillatory motion relative to a housing for the machine such that, any point on the periphery of the wobble plate follows an elongated figure-eight path.

5. A machine as claimed in claim 4 wherein:

a toothed annulus or ring on the housing, coaxial with the crank shaft, is engaged by teeth on a gear on the periphery of the wobble plate to resist contra-torque forces on the wobble plate.

6. A machine as claimed in claim 1 wherein the machine is a two-stroke or four-stroke internal combustion engine, an external combustion engine, a compressor or pump.

7. A piston-operated machine including:

a crank shaft having an intermediate crank section, the axis of the crank section being oblique to the axis of the crank shaft and the crank section passing rotatably and centrally through a wobble plate, the centre of the wobble plate lying on a prolongation of the axis of the crank shaft;

a plurality of cylinders, the axes of said cylinders being parallel to and equally spaced from the axis of the crank shaft;

a piston in each cylinder mounted on a piston rod extending substantially coaxially from the cylinder to a respective connection on the wobble plate spaced from the centre of the wobble plate;

each piston rod, at the said connection of that piston rod to the wobble plate, being rotatably and eccentrically but non-slidably engaged in a thrust member which is rotatable about an axis parallel to the axis of the crank shaft, the thrust member being connected to a thrust block which is mounted in the wobble plate for rotation about an axis parallel to the wobble plate axis, the wobble plate being restrained for only very limited rotational or oscillatory motion relative to a housing for the machine, such that any point on the periphery of the wobble plate follows an elongated figure-eight path, a control ring mounted on a cheek of the crank shaft, the control ring comprising an oblique section of a cylinder coaxial with the crank shaft and its angularity corresponding to that of the wobble plate, and the control ring engaging a retainer on each piston rod to prevent rotational movement of the rod and to assist in maintaining the piston rods coaxially aligned with their respective cylinders.

8. A machine as claimed in claim 7 wherein:

each cylinder is paired with another cylinder on the side of the wobble plate opposite from the first said piston and cylinder, taken in a direction parallel to the crank shaft axis, the pistons of the two paired cylinders being fixed to opposite ends of a common piston rod; and means are provided for restraining the piston rods from rotational movement about their respective axes.

9. A machine as claimed in claim 7 wherein:

each said thrust member forming the connection of each piston rod to the wobble plate being a compensator plate, a bearing means mounted in the compensator plate eccentrically relative to the center of that compensator plate, the compensator plate being rotatably mounted in a skewed plate, the skewed plate being part of the thrust block.

10. A machine as claimed in claim 7 wherein:

a toothed annulus or ring on the housing, coaxial with the crank shaft, is engaged by teeth on a gear on the periphery of the wobble plate to resist contra-torque forces on the wobble plate.

11. A machine as claimed in claim 7 wherein the machine is a two-stroke or four-stroke internal combustion engine, an external combustion engine, a compressor or pump.

* * * * *